United States Patent [19]

Paradine

[11] Patent Number: 5,442,735
[45] Date of Patent: Aug. 15, 1995

[54] METHOD AND APPARATUS FOR INTERACTIVELY MANIPULATING MODELS

[75] Inventor: Christopher Paradine, Southampton, England

[73] Assignee: International Business Machines Corporation, Armonk, N.Y.

[21] Appl. No.: 177,886

[22] Filed: Jan. 5, 1994

[30] Foreign Application Priority Data

Jan. 9, 1993 [GB] United Kingdom ............... 9300337

[51] Int. Cl.⁶ .................................................. G06T 5/00
[52] U.S. Cl. ...................................... 395/133; 395/128; 395/155; 395/161
[58] Field of Search ........................... 395/126–129, 395/131, 133, 141–143, 155, 161; 345/136–138; 358/231

[56] References Cited

U.S. PATENT DOCUMENTS

| | | |
|---|---|---|
| 4,607,340 | 8/1986 | Nagai . |
| 4,875,033 | 10/1989 | Kato et al. . |
| 4,928,243 | 5/1990 | Hodges et al. . |
| 4,958,272 | 9/1990 | Wake .................... 395/132 |
| 5,136,390 | 8/1992 | Inova et al. .............. 358/231 |
| 5,208,901 | 5/1993 | Sasaki et al. . |
| 5,249,263 | 9/1993 | Yanker ................... 395/131 |
| 5,276,786 | 1/1994 | Long et al. .............. 395/128 |

Primary Examiner—Almis R. Jankus
Attorney, Agent, or Firm—Paul S. Drake

[57] ABSTRACT

A method and a data processing system including a display device, an entry apparatus for enabling a user to enter data representing lines or surfaces of a model, such model data being stored in a storage device, and a retrieval apparatus for retrieving model data from the storage device and displaying the image represented by such model data on a screen of the display device. Also included are a hand-held pointing device adapted to cooperate with the screen for enabling the user to engage a particular point of the screen, a registering apparatus for registering when the pointing device is engaging the screen and for determining the particular point of the screen that is engaged, an association apparatus for associating details of the particular point of the screen engaged with a corresponding point in the model data, and a processor, responsive to input from the registering apparatus, for repetitively applying a smoothing function to the model data while the registering apparatus indicates that the pointing device is engaging the screen, the model data as smoothed being stored in the storage device after each application of the smoothing function. The smoothing function so that its smoothing effect on a particular bit of model data is dependent on a distance measure between that particular bit of model data and the point in the model data identified by the association apparatus.

8 Claims, 3 Drawing Sheets

METHOD AND APPARATUS FOR INTERACTIVELY MANIPULATING MODELS

TECHNICAL FIELD

The present invention relates to data processing systems which allow models of graphical objects to be processed by interaction with an image representing the objects in order to manipulate the model data.

BACKGROUND ART

Currently models of graphical objects can be created in a variety of ways such as by CAD drawing packages, scanned drawings, video, and other techniques. Such models are generally stored as digital data in a storage device for subsequent retrieval and manipulation. The storage device may be located either internally or externally to the data processing system used to manipulate the model data. If the storage device is external to the data processing system, then the data processing system will typically have an I/O port through which it can be connected to the storage device.

Often a user will wish to manipulate the data representing the model as he creates the model. This is usually done by providing input means to allow the user's details of the object being modelled to be fed into the data processing system as they are created. Typical input means may be a pen and tablet, or a pen on a touchscreen display, where lines drawn by the user are converted into electrical signals and input into the system. Alternatively, the input means may be a mouse, a video camera, the output of an X-ray apparatus, etc.

Most data processing systems apply smoothing functions in one form or another to the image data entered in such a manner before displaying a 2D (two dimensional) representation of the image to the user. However there is a fundamental problem for all such smoothing functions in that they must attempt to distinguish between what the user drew and what he actually meant to draw. For example, a line feature, such as a kink or a change in direction, may be mere noise due to imperfect user input, or the line feature may be a deliberate feature that the user intended to introduce. Many signal processing techniques have been developed which attempt to distinguish between imperfect user input and deliberate line features and they are generally becoming more complex and more successful at making the distinction. However, these techniques may still fail in many instances.

DISCLOSURE OF THE INVENTION

It is an object of the present invention to provide a data processing system in which a smoothing function can be applied in a easily controllable manner.

The data processing system includes a display device, and entry apparatus for enabling a user to enter data representing lines or surfaces of a model, such model data being stored in a storage device, and a retrieval apparatus for retrieving model data from the storage device and displaying the image represented by such model data on a screen of the display device. The system also includes the combination of a hand-held pointing device adapted to cooperate with the screen, for enabling the user to engage a particular point of the screen, a registering apparatus for registering when the pointing device is engaging the screen and for determining the particular point of the screen that is engaged, an association apparatus for associating details of the particular point of the screen engaged with a corresponding point in the model data, and a processor, responsive to input from said registering apparatus, for repetitively applying a smoothing function to the model data while the registering apparatus indicates that the pointing device is engaging the screen, the model data as smoothed being stored in the storage device after each application of the smoothing function, the processor being further responsive to the association apparatus for adapting the smoothing function so that its smoothing effect on a particular bit of model data is dependent on a distance measure between that particular bit of model data and the point in the model data identified by the association apparatus, the retrieval apparatus updating the image on the screen at predetermined intervals with a new image representative of the new smoothed data.

The present invention also provides a method of operating a data processing system including the steps of entering data representing lines or surfaces of a model, such model data being stored in a storage device, retrieving model data from the storage device and displaying the image represented by such model data on a screen of a display device, including the steps of registering when a hand-held pointing device adapted to cooperate with the screen is engaging, under user control, a particular point of the screen, determining the particular point of the screen that is engaged, associating details of the particular point of the screen engaged with a corresponding point in the stored model data, adapting, in response to the output of the associating step, a smoothing function such that its smoothing effect on a particular bit of model data will be dependent on a distance measure between that particular bit of model data and the point in the model data identified by the associating step, repetitively applying the smoothing function to the model data while the registering step indicates that the pointing device is engaging the screen, storing the model data as smoothed in the storage device after each application of the smoothing function, and updating the image on the screen at predetermined intervals with a new image representative of the new smoothed data.

The hand-held pointing device may be any device which enables a user to engage a particular point of the display screen. Hence, touchscreen pens, tablet styluses and light pens are suitable pointing devices. In the preferred embodiment the hand-held pointing device may be a pen adapted for use with a touchscreen display.

In preferred embodiments where a touchscreen pen is being used as the pointing device, the system may also include a pressure detector connected to the registering apparatus for detecting a pressure value obtained from the pen relating to the pressure with which the pen is contacting the screen. The processor is then responsive to the pressure detector to further adapt the smoothing function based on the pressure value.

The predetermined interval at which the image is updated on the screen may be any desirable length of time. Since the desirable update period may vary depending on what type of model the user is attempting to smooth, in the preferred embodiment the predetermined interval at which the retrieval apparatus updates the image on the screen is selectable by the user.

In one preferred embodiment, the distance dependence of the smoothing function is such that the degree of smoothing on a particular bit of model data is governed by a factor $1/(D^{**}r)$ where 'D' is the distance measure between the point in the model data represented by the particular bit of model data and the point in the model data identified by the association apparatus, and 'r' is a predefined factor. This has an effect such that the larger the value of 'r', the more the smoothing effect becomes less significant as D increases. That is, the smoothing effect becomes more localized around the point of the model data identified by the association apparatus.

However, in an alternative embodiment, the distance dependence of the smoothing function is such that the degree of smoothing on a particular bit of model data is governed by the factor r/D. This factor has the effect that, the larger the value of 'r', the greater the smoothing effect applied to any particular bit of model data. That is, from the user's standpoint the smoothing process may be more rapid.

'r' may be a predefined value or may be altered based on a user-variable input. In preferred embodiments where a pressure value is available, the pressure value is used by the processor to alter the value of 'r' such that 'r' increases as the pressure value increases.

The smoothed model data obtained after each application of the smoothing function can be stored in a different location than the location in which the original unsmoothed model data is stored, or alternatively can be written over the original data. Further, a number of different locations can be used such that each different version of the data (representing different amounts of smoothing) can be stored. In preferred embodiments, the original model data is retained in the storage device in addition to the model data smoothed by the processor, so that the user can fully or partially undo the smoothing process, or repeat the smoothing process on the original data.

The present invention will be described further, by way of example, with reference to an embodiment thereof as illustrated in the accompanying drawings.

BEST MODE FOR CARRYING OUT THE INVENTION

Figure 1:
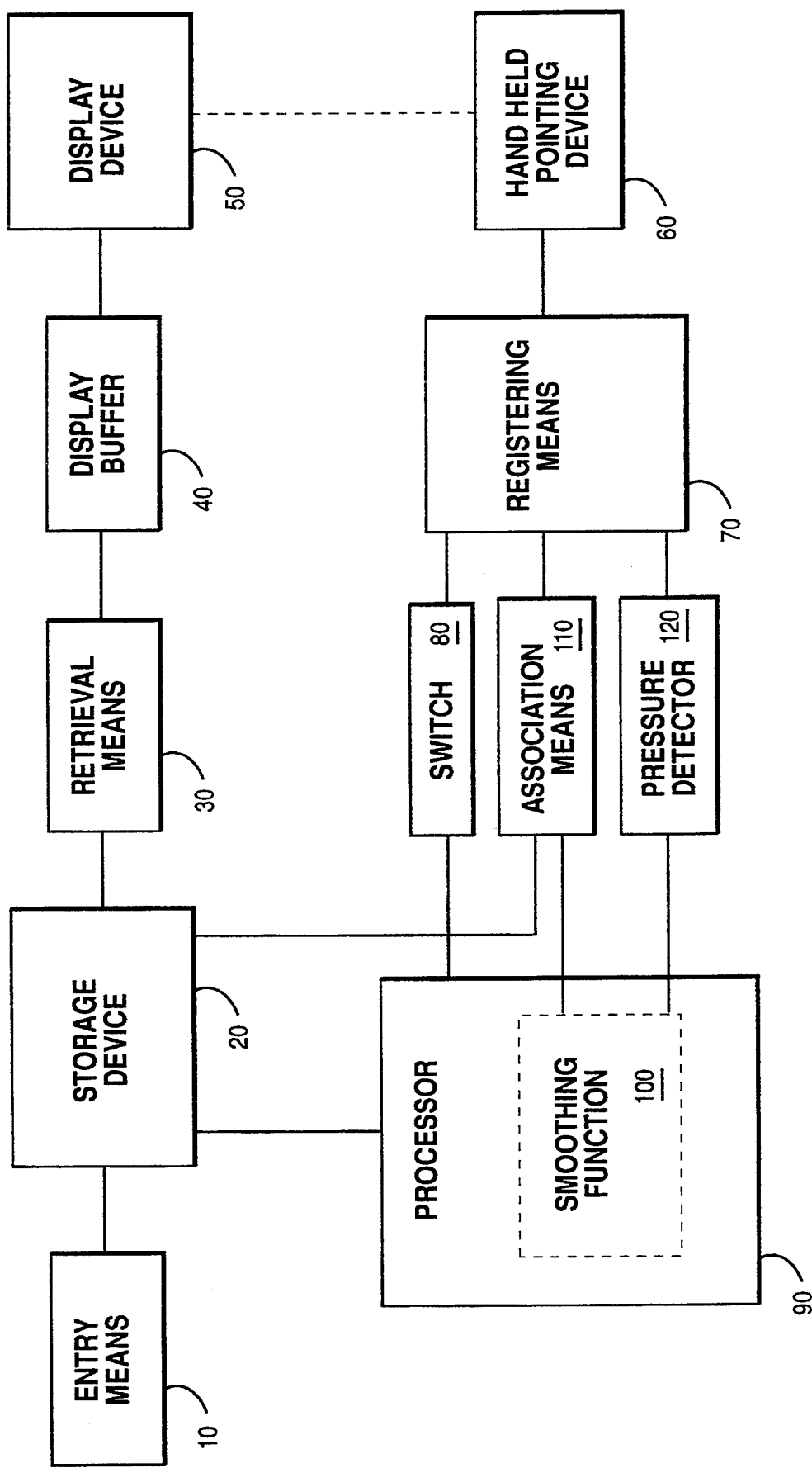
FIG. 1 is a block diagram of a data processing system in accordance with the preferred embodiment of the invention.

The preferred embodiment of the present invention will first be described with reference to FIG. 1. In the preferred embodiment the model data to be smoothed is loaded into the storage device 20 from an entry means 10. This entry means may be any of a wide range of devices, such as a video camera, an output port from an experimental imaging apparatus, a mouse, a light pen, or even another storage device. In the preferred embodiment, the entry means 10 is a pen adapted for use on a touchscreen display, the touchscreen display preferably also being the display device 50 on which 2D (two dimensional) image projections of models are displayed. With such an arrangement, lines drawn by the user on the touchscreen using the pen are converted into digital data and stored in the storage device 20 as 2D or 3D (three dimensional) model data. This model data is then retrieved from the storage device 20 by the retrieval means 30 and passed to a display buffer 40. From here the data is represented on the screen of the display device 50 as a 2D image representation of the model. The user can then construct further lines and surfaces using the pen on the touchscreen, which will be stored and displayed with no initial smoothing on the touchscreen in the manner described above. A person skilled in the art will be aware that there are many techniques for retrieving model data from storage and representing such data as 2D images on a screen.

Once the user has produced a desired model of an object, or a portion of it, he or she may then choose to smooth the lines and surfaces in order to remove unwanted features that have been drawn. To achieve this the user uses a hand-held pointing device 60 which is adapted to cooperate with the screen of the display device 50. In the preferred embodiment, the touchscreen pen used as the entry means can also be used as the pointing device 60. However in other embodiments a separate pointing device could be used. The important functional feature which the pointing device 60 must possess is that it should be able under user control to engage a particular point of the screen for a time period chosen by the user. As a result, touchscreen pens, tablet styluses or light pens make suitable pointing devices.

The pointing device 60 is connected to a registering means 70 in the data processing system which notes when the pointing device is engaged and disengaged from the screen, and further determines the particular point on the screen that is being engaged. While the pointing device 60 is engaging the screen, the registering means 70 sends a signal to a switch 80 which activates the smoothing function operation in the processor 90. The processor 90 then applies the smoothing function 100 to the model data in the storage device 20, stores the smoothed data in the storage device 20, and then repetitively applies these smoothing and storing steps to the latest smoothed data until the switch 80 deactivates the smoothing function operation. Additionally, at predetermined intervals the image representation of the 'smoothed' model is redisplayed on display device 50 by the retrieval means 30 and the display buffer 40. The interval period can be set to any time suitable for the particular task the user is performing. However, in the preferred embodiment, the interval period has a default setting such that the image representation is updated after each application of the smoothing function to the model data. The switch 80 deactivates the smoothing function operation upon receiving a signal from the registering means 70 indicating that the pointing device has been disengaged from the screen.

The smoothing function itself can be altered based on a number of parameters generated by the pointing device 60. Firstly, the screen point engaged by the pointing device, as determined by the registering means, is passed to the association means 110, wherein the screen point is associated with the corresponding bit of model data stored in the storage device 20. This information is then used to introduce a distance dependence into the smoothing function, such that the further away a particular point in the model is from the model point corresponding to the model data identified by the association device, the less the magnitude of the smoothing function applied to the bit of model data representing that particular point in the model. In preferred embodiments, this distance dependence can be introduced by including either of the following factors in the smoothing function $1/(D^{**}r)$ or $r/D$ where 'D' is the distance between the particular model point being smoothed and the point in the model data identified by the association means.

'r' is a predefined factor which in the preferred embodiment is adjustable. If a touchscreen pen is used as the pointing device, it may produce a pressure value indicating the pressure with which the pen is contacting the touchscreen. If so, this pressure value is detected by a pressure detector 120 connected to the registering means 70, and is passed to the processor 90. The processor then alters the value of 'r' based on this pressure value. Preferably the value of 'r' increases as the pressure value increases, either linearly or by some predetermined relationship. For the first factor listed above, this results in the smoothing effect becoming more localized as the pressure increases, while for the latter factor the smoothing effect on any particular bit of model data becomes greater as the pressure increases.

Figure 2:
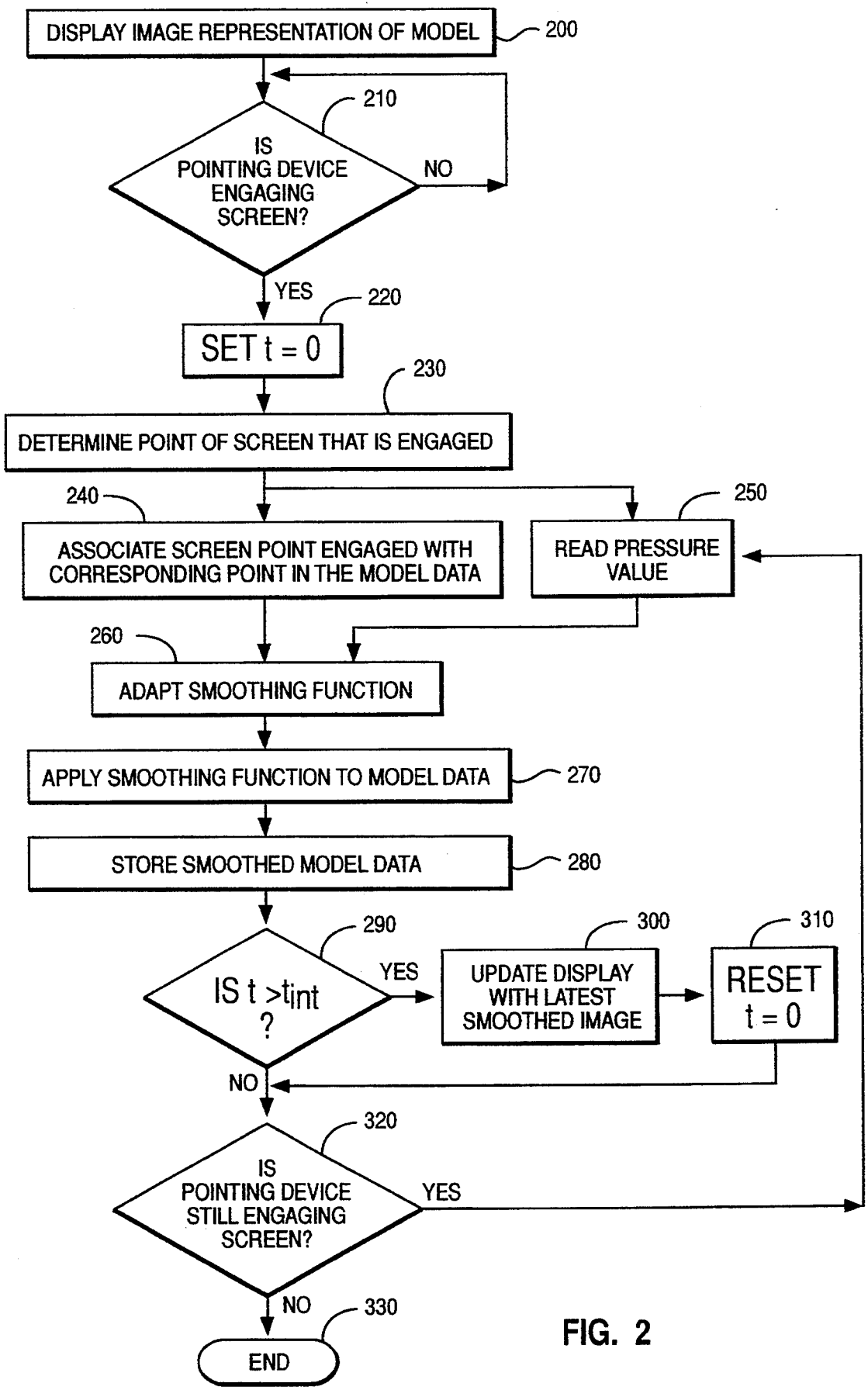
FIG. 2 is a flow diagram illustrating the processing steps carried out by the data processing system of the preferred embodiment.

The processing steps carried out by the data processing system of the preferred embodiment as part of the smoothing operation will now be described further with reference to FIG. 2. Firstly, an image representing the model to be smoothed is displayed on the display device (step 200). Then at step 210 it is determined if the pointing device is engaging the screen of the display device. If not, the process waits until the pointing device is engaging the screen.

If the pointing device is engaging the screen a clock is set to zero (step 220) and the registering means determines the point of the screen that is engaged (step 30). In the preferred embodiment, this determination is made by reading the position of the pointing device in screen coordinates.

Reference is then made to the storage 20 to associate (step 240) the screen point engaged by the pointing device with a corresponding point in the model data. If the smoothing process is going to be applied to all the model data irrespective of whether a particular bit of data represents a line, a surface, or some other feature, the corresponding point in the model data is found by computing the position in the model data of the point which would project on to the 2D display nearest to the pointing device's coordinates.

However, in the preferred embodiment, the smoothing process will only be applied to a selected component (eg. a line or a surface) of the model, and so the model data point associated with the screen point is calculated by two steps. Firstly, the 'selected' component (eg. line or surface) of the model is determined by finding which component's 2D projection is nearest (in 2D) to the pointing device's coordinates. Then the association means determines the actual model data point by computing the position in the model data of the selected component which would project on to the 2D display nearest to the pointing device's coordinates.

Next, at step 250, any pressure value produced by the pointing device (the pointing device being in this instance one that actually makes contact with the screen) relating to the pressure with which the pointing device is contacting the screen is read by the pressure detector 120.

Both the model data point from step 240 and the pressure value (if any) from step 250 are fed to the processor 90 where, at step 260, the smoothing function is adapted in accordance with this position and pressure information. The general manner in which this information is used to adapt the smoothing function has been discussed earlier with reference to FIG. 1, and will be discussed in more detail below.

Once the smoothing function has been adapted it is applied at step 270 to the model data. The amount of model data subjected to the smoothing function can be determined by the user. For example, it could be applied to all the model data represented by the image on the screen of display device 50, or alternatively, as in the preferred embodiment, it might only be applied to each bit of model data representing the selected component (e.g. a particular line).

In the preferred embodiment, before the smoothing function is applied distance calculations are first made as described below. For each bit of model data representing the selected component, a distance function is computed giving a distance measure of each bit of model data from the model data point corresponding to the pointing device's coordinates (as determined earlier). The distance can be measured in a number of different ways. For example, if the selected component is a line then the distance measure could be taken to be the distance along the line in the (3D) model. For a surface it could be the distance across the 3D surface. In some cases linear distance measurements may be adequate. A person skilled in the art will be aware of many different ways of measuring distances between two points in a model.

After the distance calculations have been made the smoothing function is applied. In the preferred embodiment, the smoothing function chosen replaces each bit of model data by a weighted sum of nearby bits of model data. There are a number of sophisticated smoothing algorithms that will be apparent to one skilled in the art, any of which could be used. However, for a line the following simple vector equation will produce acceptable results:

$$\vec{P}(i) = \frac{[r \times \vec{P}(i-1)/D] + 2\vec{P}(i) + [r \times \vec{P}(i+1)/D]}{2 + 2r/D}$$

where 'r' is the pressure value, scaled relative to some central value, 'D' is the distance measure, scaled relative to a unit distance between the particular model point and the model point determined by the association means.

Once the smoothing function has been applied, the new smoothed data is then stored at step 280 in the storage device 20 in addition to the original model data. At step 290 the clock is checked to see if the time is greater than or equal to the interval period ($t_{int}$) specified for updating the image displayed on the screen. If so, then the retrieval means is used to update the image on the screen with a new image representative of the new smoothed model data (step 300), and the clock is reset to zero (step 310).

Next the process determines at step 320 whether the pointing device is still engaging the screen of the display device. If so, then the process ends at step 330 and the smoothing process is completed. If engagement is still detected, the process returns to step 250 and steps 250 to 320 are repeated. Again, if $t_{int}$ has expired the image on the screen is updated so as to represent the latest version of the smoothed model data.

This smoothing process will be repeated until, at step 320, it is detected that the pointing device is no longer engaging the screen of the display device.

Since the original model data is retained in the storage device 20 during the smoothing operation, then if the user 'overshoots' during smoothing, he can back out under keyboard control and re-perform the smoothing process using the original data. Further, if smoothed versions of the model data are retained corresponding to the results of each application of the smoothing function, then the user can move back to any desired version rather than returning to the original unsmoothed version of the model.

Since the smoothing function applied in the preferred embodiment tends to collapse curves back towards a straight line, then during the smoothing operation the image of the curve on the screen will tend to move inwardly away from the contact point of the pen on the screen. In some cases this may be undesirable. Hence, in order to rectify this, the preferred embodiment includes a step whereby the whole curve is remapped after each application of the smoothing function so that the line always passes through the contact point. By this approach the noise or jitter still gets smoothed away but the overall shape of the curve is better maintained (such as a straight line with a single 'blister' on it). If the user smooths from the peak of the blister, then in the standard case the blister gradually disappears until the line is straight. However, in the preferred embodiment, the line relaxes to a smooth curve through the endpoints of the line and the contact point of the pointing device on the screen.

Figure 3:
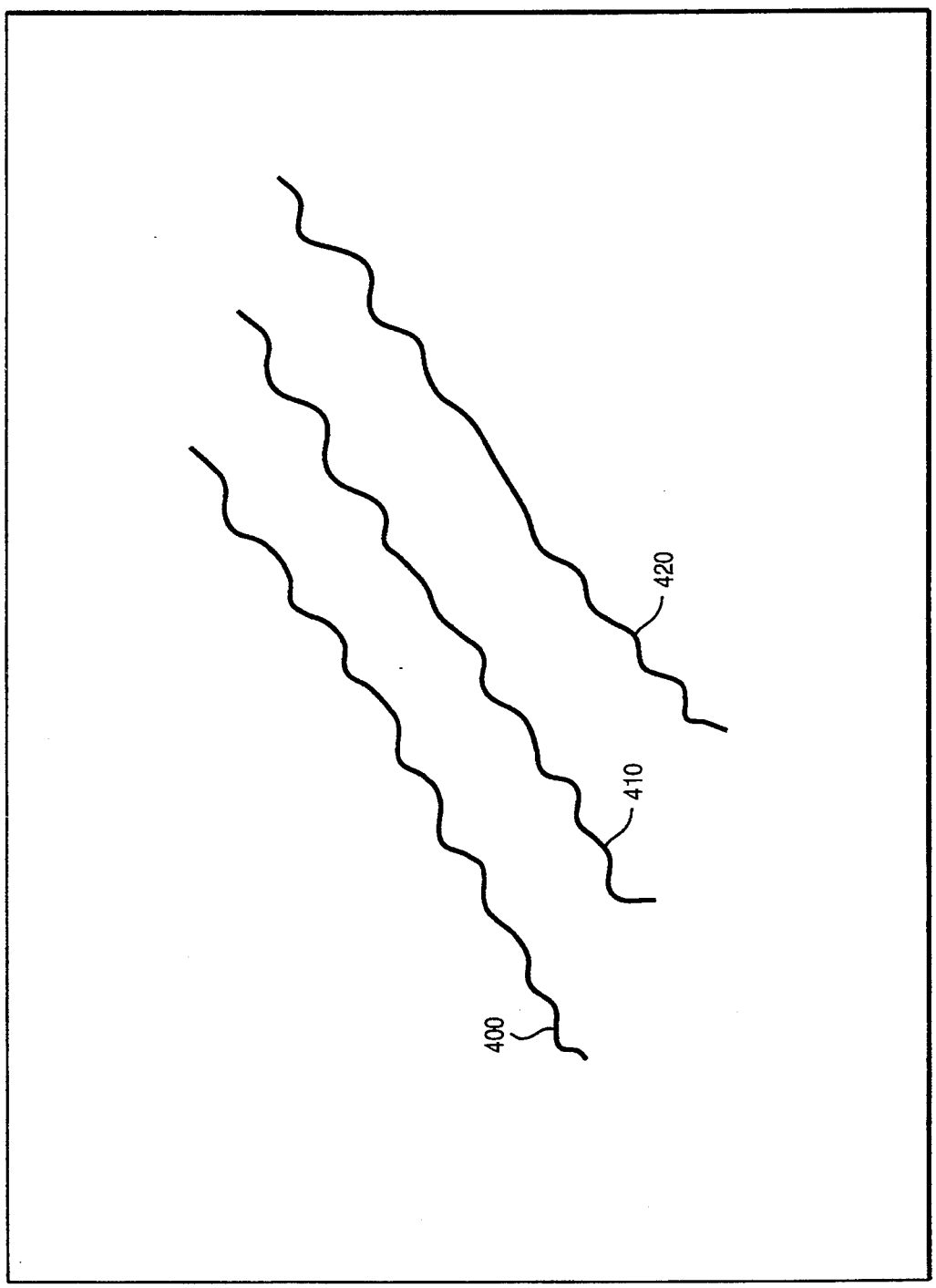
FIG. 3 illustrates the smoothing process by its effect on a particular line, the three lines shown representing the same line after it has been exposed to different periods of smoothing.

In FIG. 3 the smoothing process is illustrated by its effect on a particular line. Three lines are shown in FIG. 3, each representing the same line after it has been exposed to different periods of smoothing. Line 400 is the original unsmoothed line as seen on the screen of the display device 50 following retrieval of the line model data from storage 20. The user then engages a point on the screen near to the center of the line, thus initiating the smoothing process of the preferred embodiment. Line 410 shows a line displayed on the screen to illustrate how the line model data has been altered after a small period of smoothing. In practice this line would replace the line 400 originally displayed. If the user decides to continue smoothing the line for a further period of time the line 410 would be replaced by line 420 illustrating further smoothing of the line model data.

Line 420 illustrates that the maximum degree of smoothing has taken place in the proximity of the point in the model data corresponding to the engaged screen point, while the minimum degree of smoothing has occurred at the farthest points of the line (in this case the two ends of the line).

By the above described technique, smoothing of model data can be performed in an easily controllable manner. User input via the pointing device is used to control the point of maximum smoothing, the duration of smoothing and the smoothing function to be applied to the model data. The effect that the smoothing is having is evident to the user since the image on the display screen is updated at desirable intervals. Hence, the user is able to stop the process as soon as the desirable amount of smoothing has taken place. Furthermore, the process can be repeated a number of times until exactly the right effect has been achieved since the system retains the original unsmoothed model data.

What is claimed is:

1. A method for smoothing an image constructed from a set of graphical object, location data, comprising:

displaying said set of graphical object location data as said image on a display;

obtaining from said user with an entry means a location on said display;

smoothing said displayed image with a processor by modifying said set of graphical object location data based on said obtained location each time a location on said display is obtained from said user.

2. The method of claim 1 wherein said step of obtaining includes obtaining with said entry means a magnitude of smoothing and said step of smoothing includes modifying with said processor said set of graphical object location data based on said obtained magnitude.

3. The method of claim 2 further comprising a step of selecting said set of graphical object location data from a plurality of objects.

4. The method of claim 3 wherein said step of obtaining includes obtaining with a hand-held pointing device the location on said display and obtaining with a means for detecting pressure the magnitude of smoothing.

5. An apparatus for smoothing an image constructed from a set of graphical object location data, comprising:

a display for displaying said set of graphical object location data as said image on display;

entry means for obtaining from said user a location on said display;

a processor for smoothing said displayed image by modifying set of modeled objects based on said obtained location so long as a location on said display is obtained from said user.

6. The apparatus of claim 5 wherein said entry means includes means for obtaining a magnitude of smoothing and said processor includes modifying said set of graphical object location data based on said obtained magnitude.

7. The apparatus of claim 6 wherein said processor includes selecting said set of graphical object location data from a plurality of objects.

8. The apparatus of claim 7 wherein said entry means includes a hand-held pointing device for obtaining the location on said display and a means for detecting pressure for obtaining the magnitude of smoothing.

* * * * *